US012650189B1

(12) United States Patent
Tao et al.

(10) Patent No.: US 12,650,189 B1
(45) Date of Patent: Jun. 9, 2026

(54) BALL VALVE BUTT-JOINT STRUCTURE

(71) Applicant: WTP Technology (Su Zhou) Co., Ltd.,
Wujiang (CN)

(72) Inventors: Zhiqiang Tao, Wujiang (CN);
Huanyang Zhong, Wujiang (CN);
Denghua Zhao, Wujiang (CN)

(73) Assignee: WTP Technology (Su Zhou) Co., Ltd.,
Wujiang (CN)

( * ) Notice: Subject to any disclaimer, the term of this
patent is extended or adjusted under 35
U.S.C. 154(b) by 0 days.

(21) Appl. No.: 19/381,024

(22) Filed: Nov. 6, 2025

(30) Foreign Application Priority Data

Sep. 16, 2025 (CN) .......................... 202511316873.8

(51) Int. Cl.
*F16L 29/00* (2006.01)
*F16K 27/06* (2006.01)
*F16K 31/53* (2006.01)
*F16L 37/373* (2006.01)

(52) U.S. Cl.
CPC .......... *F16L 29/002* (2013.01); *F16K 27/067*
(2013.01); *F16K 31/535* (2013.01); *F16L*
*37/373* (2013.01); *Y10T 137/87973* (2015.04)

(58) Field of Classification Search
CPC ...... F16K 27/067; F16K 31/535; F16K 31/54;
F16L 29/04; F16L 37/373; Y10T
137/0508; Y10T 137/87973
See application file for complete search history.

(56) References Cited

U.S. PATENT DOCUMENTS

| | | | | | |
|---|---|---|---|---|---|
| 3,159,180 | A | * | 12/1964 | Courtot ................. | F16L 37/373 |
| | | | | | 137/614.06 |
| 4,438,779 | A | * | 3/1984 | Allread ................. | F16L 37/113 |
| | | | | | 285/85 |
| 4,622,997 | A | * | 11/1986 | Paddington ............. | F16L 37/62 |
| | | | | | 137/595 |
| 5,402,825 | A | * | 4/1995 | McCracken .......... | F16L 37/373 |
| | | | | | 137/614.01 |
| 6,945,273 | B2 | * | 9/2005 | Reid ..................... | F16L 37/244 |
| | | | | | 251/149.9 |

(Continued)

FOREIGN PATENT DOCUMENTS

| | | |
|---|---|---|
| CN | 209026298 U | 6/2019 |
| CN | 217177495 U | 8/2022 |

(Continued)

OTHER PUBLICATIONS

EP25214305.2 Extended European Search Report Mar. 23, 2026.

*Primary Examiner* — Robert K Arundale
(74) *Attorney, Agent, or Firm* — Wood Herron & Evans
LLP

(57) ABSTRACT

Provided is a ball valve butt-joint structure including two
ball valve assemblies which are coaxially butt-jointed and
have the same structure. Each ball valve assembly includes
a valve body, a valve core, a valve stem, and a gear. The
valve core is disposed within the valve body. One end of the
valve stem is disposed to pass through the valve body and is
fixedly connected to the valve core, and another end of the
valve stem extends out of the valve body and is sleeved with
the gear. The gear drives the valve stem to rotate. A butt-joint
end surface of each valve body is provided with a rack
extending circumferentially. The rack of one ball valve
assembly is configured to mesh with the gear of another ball
valve assembly.

16 Claims, 6 Drawing Sheets

(56) References Cited

U.S. PATENT DOCUMENTS

| | | | | | |
|---|---|---|---|---|---|
| 8,132,781 | B2 * | 3/2012 | Haunhorst | ............ | F16L 37/373 |
| | | | | | 251/149.9 |
| 8,662,108 | B2 * | 3/2014 | Haunhorst | ......... | F16L 37/0841 |
| | | | | | 251/248 |
| 8,887,762 | B2 * | 11/2014 | Densel | .................... | F16L 37/36 |
| | | | | | 251/149.9 |
| 8,967,177 | B2 * | 3/2015 | Haunhorst | .............. | F16L 37/36 |
| | | | | | 137/614.01 |
| 9,303,774 | B2 * | 4/2016 | Lomax | .................... | F16K 5/201 |
| 11,867,333 | B2 * | 1/2024 | Hamkens | .............. | F16L 37/373 |
| 2010/0140522 | A1 * | 6/2010 | Chang | .................... | F16K 35/14 |
| | | | | | 251/315.16 |
| 2013/0032234 | A1 | 2/2013 | Densel et al. | | |
| 2022/0034412 | A1 * | 2/2022 | Chen | ..................... | F16L 37/02 |

FOREIGN PATENT DOCUMENTS

| | | | |
|---|---|---|---|
| CN | 218152393 | U | 12/2022 |
| CN | 219774969 | U | 9/2023 |
| CN | 118687013 | A | 9/2024 |
| CN | 120799228 | A | 10/2025 |
| GB | 844258 | A | 8/1960 |

* cited by examiner

BALL VALVE BUTT-JOINT STRUCTURE

CROSS-REFERENCE TO RELATED APPLICATION

The present application claims priority to Chinese Patent Application No. 202511316873.8, filed with the China National Intellectual Property Administration (CNIPA) on Sep. 16, 2025, the disclosure of which is incorporated herein by reference in its entirety.

TECHNICAL FIELD

The present disclosure relates to the technical field of ball valves, and specifically, a ball valve butt-joint structure.

BACKGROUND

In water supply systems, it is sometimes necessary to butt-joint two ball valve assemblies for communication. In the related art, four actions are required when the two ball valve assemblies are butt-jointed and assembled, that is, first, joints of two valve bodies are buckled; second, the valve bodies are rotated to be tightened; and then, handles of the two ball valve assemblies are rotated in sequence to rotate and open valve cores inside the two valve bodies respectively, thereby enabling the liquid flow. In this way, the opening of the two ball valve assemblies is completed through the four actions, making the operation relatively cumbersome.

Therefore, there is an urgent need for a ball valve butt-joint structure to solve the above-described problems.

SUMMARY

The objective of the present disclosure is to provide a ball valve butt-joint structure, which can complete the butt-joint only by two actions and has a quick and convenient operation.

The present disclosure is achieved by the following technical solutions.

A ball valve butt-joint structure is provided. The ball valve butt-joint structure includes two ball valve assemblies which are coaxially butt-jointed and have the same structure. Each of the two ball valve assemblies includes a valve body, a valve core, a valve stem, and a gear. The valve core is disposed within the valve body. One end of the valve stem is disposed to pass through the valve body and is fixedly connected to the valve core, and another end of the valve stem extends out of the valve body and is sleeved with the gear. The gear is configured to drive the valve stem to rotate. A butt-joint end surface of each valve body is provided with a rack extending circumferentially, and the rack of one ball valve assembly of the two ball valve assemblies is configured to mesh with the gear of another ball valve assembly of the two ball valve assemblies.

As a solution, each of the two ball valve assemblies further includes a linkage member, a push-top member, a lifting member, and a transmission wheel. One end of the linkage member is elastically connected to the valve body, and another end of the linkage member is convexly provided with a linkage block. The linkage member cooperates with the push-top member and is configured to drive the push-top member to move upward or downward. The transmission wheel is circumferentially and fixedly sleeved outside the valve stem. A radial inner side of the rack is provided with a push-top portion. A circumferential length of the push-top portion is less than a circumferential length of the rack. The rack covers the push-top portion. The push-top portion is configured to push the linkage block to switch the linkage member from an ejected position to a pushed-in position. In the ejected position, the push-top member pushes against the lifting member, and the lifting member is disposed to pass through the gear to lift the transmission wheel until the transmission wheel is disengaged from the gear. In the pushed-in position, the lifting member moves downward along with the push-top member, and the transmission wheel is engaged with the gear and is configured to rotate synchronously with the gear.

As a solution, the linkage block is an isosceles triangle or an isosceles trapezoid, and two circumferential ends of the push-top portion have matching inclined surfaces that match two inclined surfaces of the linkage block.

As a solution, a bottom surface of the linkage member is provided with a first push block, the first push block has a first push-top inclined surface, a bottom surface of the push-top member is provided with a second push block, the second push block has a second push-top inclined surface, and the first push-top inclined surface is in sliding fit with the second push-top inclined surface, so that the linkage member is configured to drive the push-top member to move downward when the linkage member moves to the pushed-in position.

As a solution, a mounting platform is disposed on the valve body, a circumferential side of the mounting platform is provided with a frame, and a first elastic member is abutted between an end of the linkage member facing away from the linkage block and the frame.

As a solution, the frame is provided with a slide hole, and the end of the linkage member facing away from the linkage block is slidably disposed within the slide hole.

As a solution, the push-top member includes a chassis and a push-top rod connected to the chassis. The push-top rod is configured to push against the lifting member. A mounting platform is disposed on the valve body. A circumferential side of the chassis is provided with a lug. A second elastic member is abutted between the lug and the mounting platform.

As a solution, a limit rod is vertically disposed on the mounting platform, the second elastic member is sleeved outside the limit rod, the lug is provided with a limit hole, and the limit rod is disposed to pass through the limit hole.

As a solution, an outer periphery of the valve stem is fixedly connected to a rotation disk, the rotation disk is located between the chassis and the lifting member, and the rotation disk is provided with a through hole. In the ejected position, the push-top rod is configured to push against the lifting member via the through hole.

As a solution, two push-top rods are disposed on the chassis, the two push-top rods are disposed opposite to each other, the rotation disk is provided with four through holes, and the four through holes are uniformly disposed at intervals in a circumferential direction of the rotation disk.

As a solution, the lifting member includes a lifting disk and multiple lifting rods connected to the lifting disk. The multiple lifting rods are uniformly disposed at intervals in a circumferential direction of the lifting disk. The lifting disk is located between the gear and the push-top member. A lifting rod of the multiple lifting rods is configured to pass through the gear to lift the transmission wheel.

As a solution, one of an outer wall of the valve stem and an inner wall of the transmission wheel is provided with a convex rib, and another of the outer wall of the valve stem and the inner wall of the transmission wheel is provided with a groove. The convex rib is configured to be inserted into and fitted with the groove.

As a solution, a center of the gear is provided with an accommodation hole for accommodating the transmission wheel, and a hole wall of the accommodation hole is engaged with an outer peripheral wall of the transmission wheel through gear teeth.

As a solution, a top end of the valve stem is connected to a top cap, an outer diameter of the top cap is greater than an outer diameter of the valve stem, a third elastic member is sleeved outside the valve stem, and the third elastic member is abutted between the top cap and the transmission wheel.

As a solution, one end of each valve body is provided with a flange, flanges of the two ball valve assemblies are butt-jointed, the rack and a rotation hole which corresponds to a position of the gear and extends circumferentially are disposed on each flange, and the rack on one flange is configured to pass through the rotation hole on another flange and mesh with the gear corresponding to the rotation hole.

As a solution, the rotation hole includes a first hole segment and a second hole segment communicating with each other. The radial width of the first hole segment is greater than the radial width of the second hole segment. The rack includes a rack main body and a connection portion connected between the flange and the rack main body. A radial thickness of the rack main body is greater than a radial thickness of the connection portion. The rack main body is fitted to the first hole segment, and the connection portion is fitted to the second hole segment.

The present disclosure has the following beneficial effects. The present disclosure provides the ball valve butt-joint structure. When the two ball valve assemblies are assembled, first, the two valve bodies are butt-jointed so that the rack of the first ball valve assembly meshes with the gear of the second ball valve assembly, and simultaneously, the rack of the second ball valve assembly meshes with the gear of the first ball valve assembly. Then, the two valve bodies are rotated in opposite directions to be tightened, the valve bodies may drive the racks on the valve bodies to rotate, the rack on the first valve body may drive the gear on the second valve body to rotate, the rack on the second valve body may drive the gear on the first valve body to rotate, each gear may drive its corresponding valve stem to rotate, and each valve stem may drive its corresponding valve core to rotate to be opened, thereby achieving the synchronous opening of the two ball valve assemblies. Therefore, the ball valve butt-joint structure provided in this embodiment can simultaneously open the valve cores of the two ball valve assemblies only by two actions, that is, butt-jointing and rotating, during assembly. Compared with the related art, the ball valve butt-joint structure provided in this embodiment omits two actions, enables one-step completion, has a quick and convenient operation, and saves time and effort.

BRIEF DESCRIPTION OF DRAWINGS

In order to describe technical solutions in embodiments of the present disclosure or in the related art more clearly and understandably, the drawings used for describing the embodiments or the related art will be briefly introduced below. The drawings in the following description are merely some embodiments of the present disclosure. For those of ordinary skill in the art, other drawings may also be obtained without creative labor according to these drawings.

Figure 1:
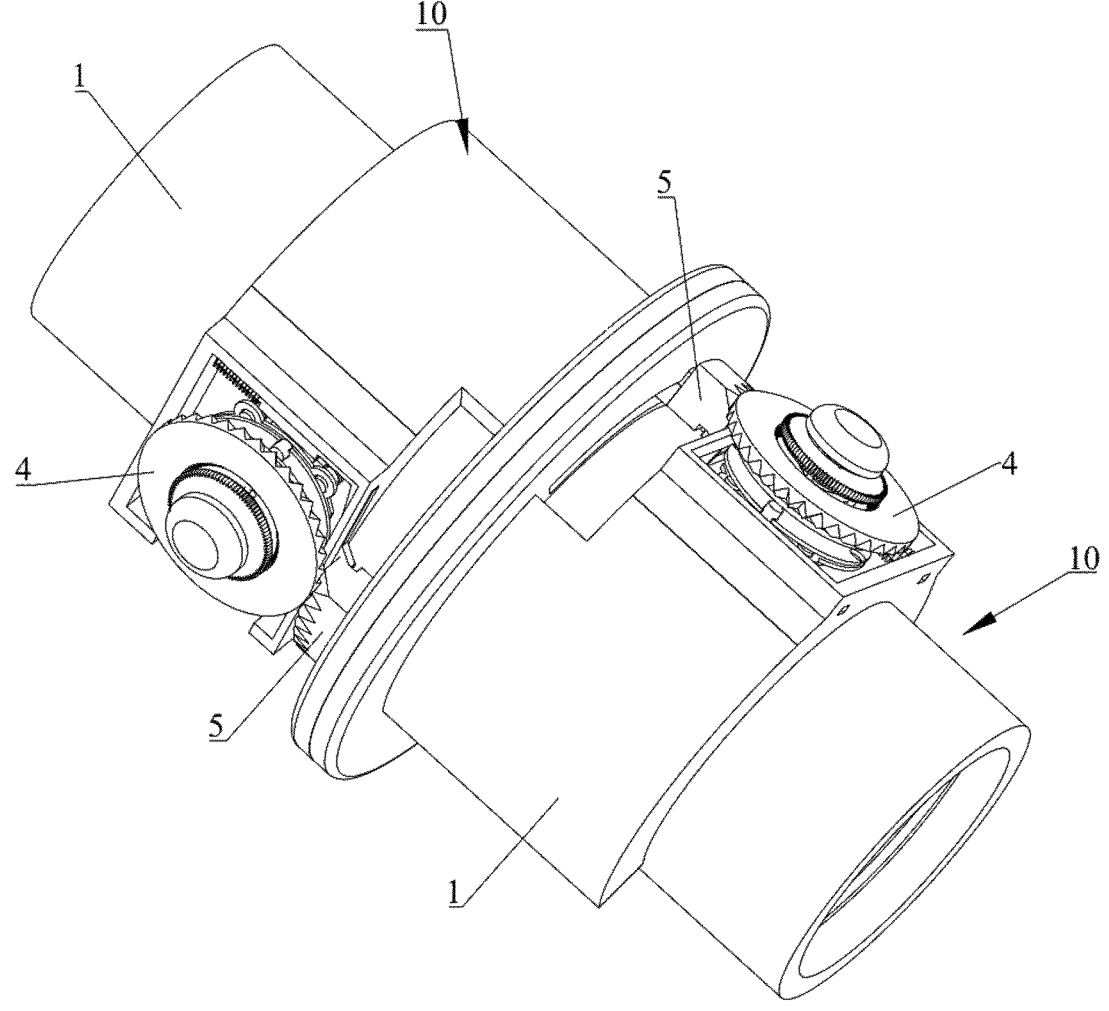
FIG. 1 is a schematic structural diagram of a ball valve butt-joint structure according to an embodiment of the present disclosure.

LIST OF REFERENCE NUMBERS 10 ball valve assembly
1 valve body
11 flange
111 rotation hole
1111 first hole segment
1112 second hole segment
12 mounting platform
13 frame
131 slide hole
14 limit rod
2 valve core
21 flow-through hole
3 valve stem
31 rotation disk
311 through hole
32 convex rib
33 top cap
34 third elastic member
4 gear
41 accommodation hole
5 rack
51 rack main body
52 connection portion
53 push-top portion
54 matching inclined surface
6 linkage member
61 linkage block
62 first push block
621 first push-top inclined surface
63 first elastic member
7 push-top member
71 second push block
711 second push-top inclined surface
72 chassis
721 lug
722 limit hole
73 push-top rod
74 second elastic member
8 lifting member
81 lifting disk
82 lifting rod
9 transmission wheel
91 groove

DETAILED DESCRIPTION

The present disclosure will be described in further detail below with reference to the accompanying drawings and embodiments. It is to be understood that the specific embodiments described herein are merely for illustration of the present disclosure, and are not intended to limit the present disclosure. In addition, it is to be noted that, for convenience of description, only some, but not all, of the structures related to the present disclosure are shown in the drawings.

In the description of the present disclosure, unless otherwise expressly specified and defined, the term "connected to each other", "connected", or "fixed" is to be construed in a broad sense, for example, as securely connected, detachably connected, or integrated; mechanically connected or electrically connected; directly connected to each other, indirectly connected to each other via an intermediary, internal connection between two elements, or interaction between two elements. For those of ordinary skill in the art, specific meanings of the preceding terms in the present disclosure may be understood based on specific situations.

In the present disclosure, unless otherwise expressly specified and defined, a first feature being "on" or "under" a second feature may include the first feature and the second feature being in direct contact, or may include the first feature and the second feature not being in direct contact but being in contact with each other through an additional feature therebetween. Moreover, the first feature being "on", "above" or "over" the second feature includes the first feature being directly on, above or over and obliquely on, above or over the second feature, or simply indicates that the first feature is at a higher level than the second feature. The first feature being "under", "below" or "underneath" the second feature includes the first feature being directly under, below or underneath and obliquely under, below or underneath the second feature, or simply represents that the first feature is at a lower level than the second feature.

In the description of this embodiment, the orientational or positional relationships indicated by terms "above", "below", "left", "right", and the like are based on the orientational or positional relationships shown in the drawings, and are merely for ease of description and simplifying an operation, rather than indicating or implying that the referred device or element must have a specific orientation and be constructed and operated in a specific orientation, and thus it is not to be construed as limiting the present disclosure. Moreover, the terms "first" and "second" are used only to distinguish between descriptions and have no special meaning.

Figure 2:
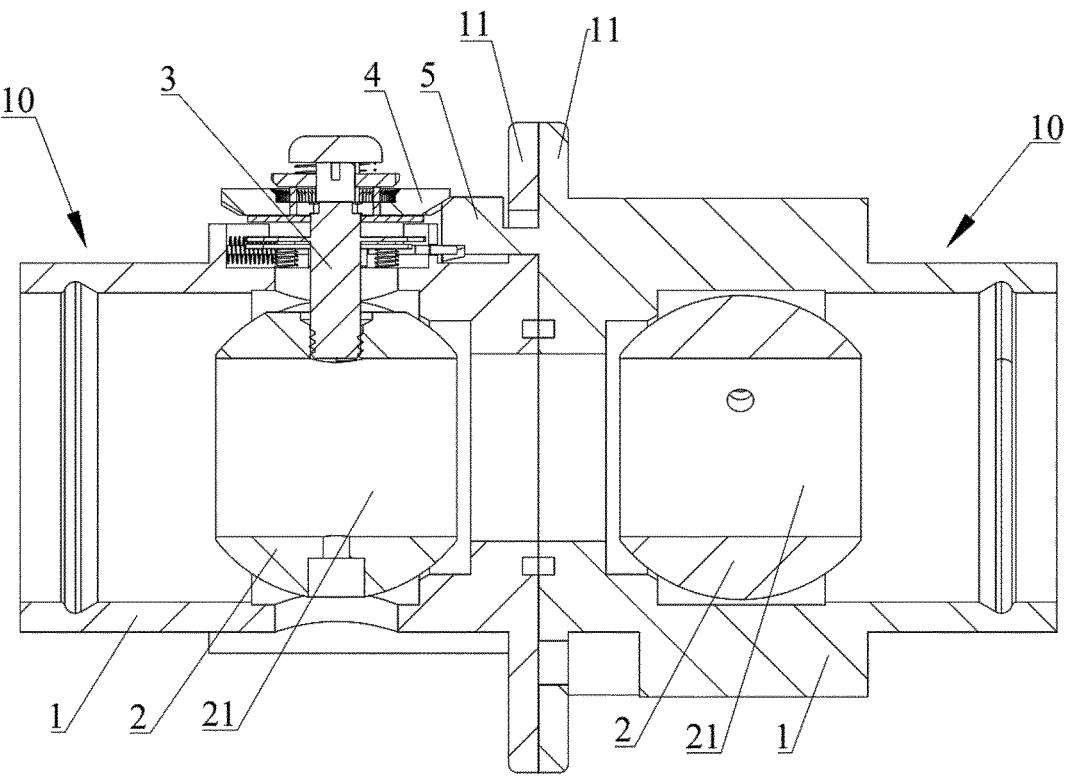
FIG. 2 is a sectional view of a ball valve butt-joint structure according to an embodiment of the present disclosure.

This embodiment provides a ball valve butt-joint structure. As shown in FIG. 1 and FIG. 2, the ball valve butt-joint structure includes two ball valve assemblies 10 that are coaxially butt-jointed and have the same structure. Each ball valve assembly 10 includes a valve body 1, a valve core 2, a valve stem 3, and a gear 4. During assembly, two valve bodies 1 are coaxially butt-jointed, and a sealing ring is embedded on each of butt-joint surfaces of the two valve bodies 1 to achieve sealing after butt-jointing and prevent liquid leakage. The valve core 2 is spherical and is disposed within the valve body 1. One end of the valve stem 3 is disposed to pass through the valve body 1 and is fixedly connected to the valve core 2, and another end of the valve stem 3 extends out of the valve body 1 and is sleeved with the gear 4. The gear 4 may drive the valve stem 3 to rotate. A butt-joint end surface of each valve body 1 is provided with a rack 5 extending circumferentially. The rack 5 of one ball valve assembly 10 may mesh with the gear 4 of another ball valve assembly 10.

As shown in FIG. 2, the valve core 2 is provided with a flow-through hole 21 communicating with a flow-through channel of the valve body 1. When the flow-through hole 21 is perpendicular to an axis of the flow-through channel, the fluid can be shut off, and in this case, the ball valve assembly 10 is in a closed state. Rotating the valve stem 3 drives the valve core 2 to rotate, so that the overlapping area between the flow-through hole 21 and the flow-through channel may be adjusted, thereby adjusting the flow rate. When the axis of the flow-through hole 21 of the valve core 2 is completely coincident with the axis of the flow-through channel, the fluid may be conducted, and the valve core 2 may be switched from 0° to 90°, thereby achieving the opening of the ball valve assembly 10.

In this embodiment, when the two ball valve assemblies 10 are not butt-jointed, the valve core 2 is in a completely closed state. When the two ball valve assemblies 10 are assembled, first, the two valve bodies 1 are manually butt-jointed so that the rack 5 of a first ball valve assembly 10 meshes with the gear 4 of a second ball valve assembly 10, and simultaneously, the rack 5 of the second ball valve assembly 10 meshes with the gear 4 of the first ball valve assembly 10. Then, the two valve bodies 1 are rotated in opposite directions to be tightened, the valve bodies 1 may drive the racks 5 on the valve bodies 1 to rotate, the rack 5 on the first valve body 1 may drive the gear 4 on the second valve body 1 to rotate, the rack 5 on the second valve body 1 may drive the gear 4 on the first valve body 1 to rotate, each gear 4 may drive its corresponding valve stem 3 to rotate, and each valve stem 3 may drive its corresponding valve core 2 to rotate to be opened, thereby achieving the synchronous opening of the two ball valve assemblies 10. Therefore, the ball valve butt-joint structure provided in this embodiment can simultaneously open the valve cores 2 of the two ball valve assemblies 10 only by two actions, that is, butt-jointing and rotating, during assembly. Compared with the related art, the ball valve butt-joint structure provided in this embodiment omits two actions, enables one-step completion, has a quick and convenient operation, and saves time and effort.

Figure 3:
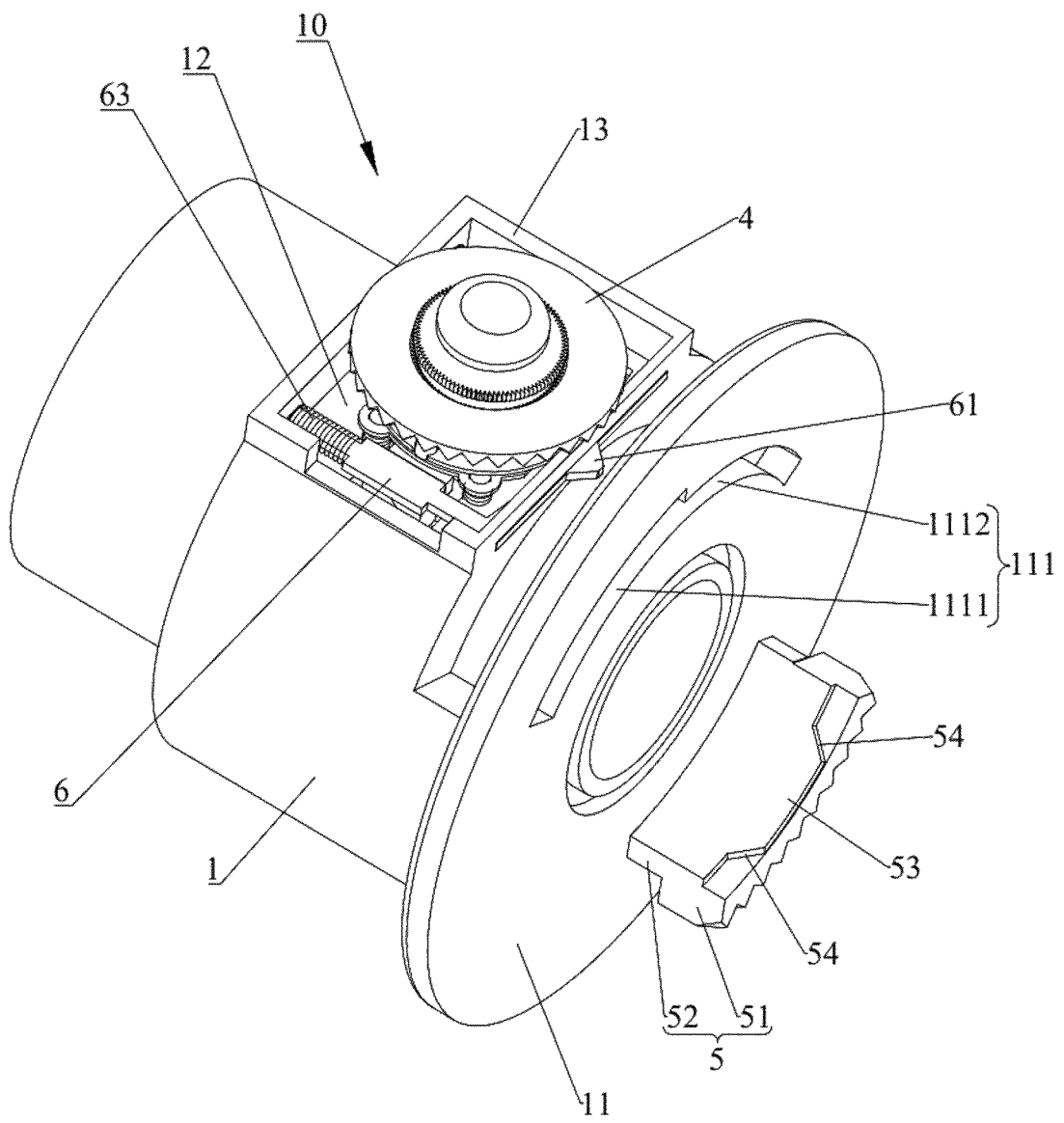
FIG. 3 is a schematic structural diagram of a single ball valve assembly according to an embodiment of the present disclosure.

In an embodiment, as shown in FIGS. 2 and 3, one end of each valve body 1 is provided with a flange 11. The outer diameter of the flange 11 is greater than the outer diameter of the valve body 1. The flanges 11 of the two ball valve assemblies 10 are butt-jointed. The above-described rack 5 and a rotation hole 111 which corresponds to a position of the gear 4 and extends circumferentially are disposed on each flange 11. The rack 5 and the rotation hole 111 on the same flange 11 are disposed opposite to each other. The rack 5 on one flange 11 may pass through the rotation hole 111 on another flange 11 and mesh with the gear 4 corresponding to that rotation hole 111. Specifically, the rack 5 on the first flange 11 may pass through the rotation hole 111 on the second flange 11 to mesh with the gear 4 on the second valve body 1, and the rack 5 on the second flange 11 may pass through the rotation hole 111 on the first flange 11 to mesh with the gear 4 on the first valve body 1. The positioning of the rotation holes 111 facilitates the coaxial butt-joint of the two ball valve assemblies 10. In addition, the two ends of the rack 5 may abut against hole walls at the two ends of the rotation hole 111, respectively, thereby enabling the restriction and indication of the rotation angle of the valve body 1.

Two abutment positions correspond to angles at which the valve core 2 is completely opened and completely closed, respectively.

Specifically, as shown in FIG. 3, the rotation hole 111 includes a first hole segment 1111 and a second hole segment 1112 communicating with each other. The radial width of the first hole segment 1111 is greater than the radial width of the second hole segment 1112. The rack 5 includes a rack main body 51 and a connection portion 52 connected between the flange 11 and the rack main body 51, the radial thickness of the rack main body 51 is greater than the radial thickness of the connection portion 52, the rack main body 51 is fitted to the first hole segment 1111, and the connection portion 52 is fitted to the second hole segment 1112. When the two flanges 11 are butt-jointed, the rack main body 51 first passes through the first hole segment 1111 and meshes with the gear 4, and in this case, the connection portion 52 is also located in the first hole segment 1111. Then, during the rotation of the valve body 1, the connection portion 52 is gradually rotated into the second hole segment 1112. When the valve body 1 is rotated to a limit position, the connection portion 52 abuts against an end surface of the second hole segment 1112 to form a limit, and in this case, the valve core 2 is completely opened. The radial thickness of the rack main body 51 is greater than the radial width of the second hole segment 1112; therefore, the rack main body 51 cannot disengage from the second hole segment 1112, thereby achieving axial limit and tightening of the two valve bodies 1 after they are butt-jointed (that is, the two valve bodies 1 cannot be separated), preventing loosening, and ensuring the normal operation. This tightening arrangement is simple and eliminates the need for a separate tightening structure, thereby avoiding an increase in structural complexity. In addition, after axial tightening is achieved through the matching of the rack 5 and the rotation hole 111, the butt-joint surfaces of the two valve bodies 1 are fitted tightly, thereby ensuring the sealing reliability between the butt-joint surfaces of the two valve bodies 1.

In the actual butt-joint process of the two ball valve assemblies 10, when the rack 5 is just in contact with the gear 4, the butt-joint surfaces of the two valve bodies 1 may not be completely tightly fitted, that is, the two butt-joint surfaces are not sealed well. In this case, if the valve body 1 is rotated to drive the gear 4 to rotate, the gear 4 may drive the valve core 2 to rotate through the valve stem 3. As long as the valve core 2 is slightly rotated by a small angle, water may flow between the two ball valve assemblies 10, and in this case, liquid leakage may occur between the butt-joint surfaces of the two valve bodies 1. In addition, when the two ball valve assemblies 10 are disengaged, the valve cores 2 of the two ball valve assemblies 10 should theoretically be in the completely closed state. However, if the gear 4 is rotated due to accidental contact, the valve core 2 may be rotated, thereby causing liquid leakage.

Figure 4:
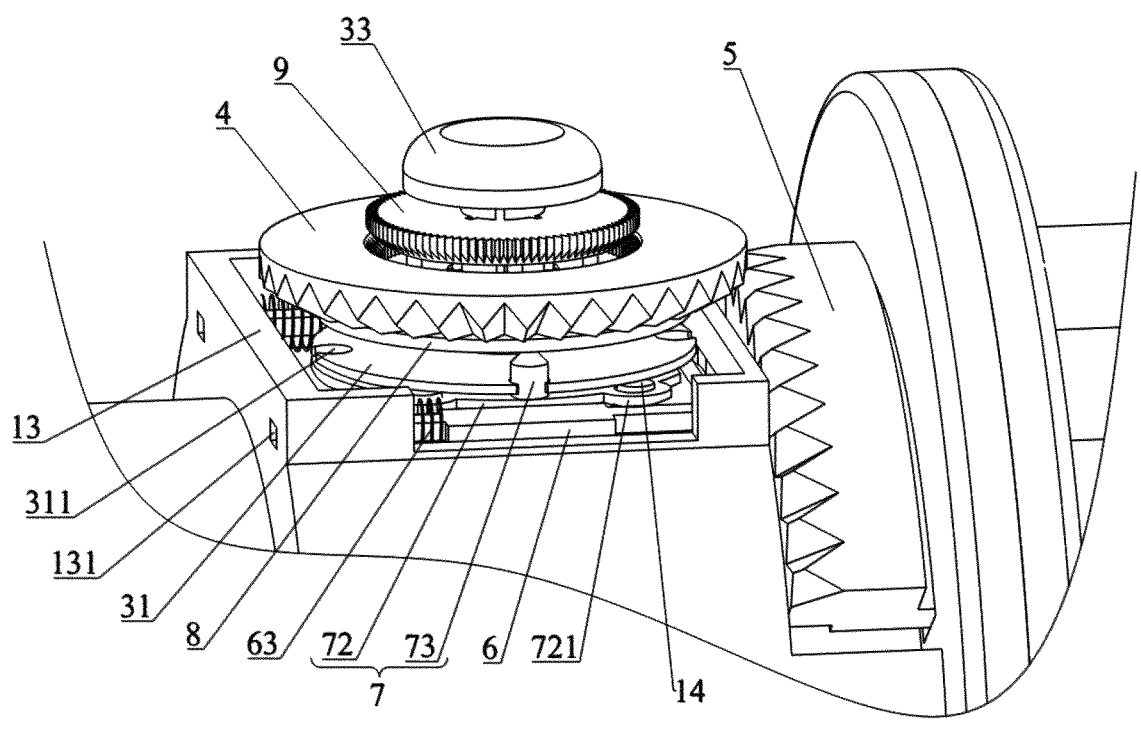
FIG. 4 is a schematic diagram showing a butt-joint of two ball valve assemblies in a first state according to an embodiment of the present disclosure.

In order to solve the above-described problems, in this embodiment, as shown in FIGS. 3 and 4, the ball valve assembly 10 further includes a linkage member 6, a push-top member 7, a lifting member 8, and a transmission wheel 9. One end of the linkage member 6 is elastically connected to the valve body 1, and another end of the linkage member 6 is convexly provided with a linkage block 61. The linkage member 6 cooperates with the push-top member 7 and is configured to drive the push-top member 7 to move upward or downward. The push-top member 7 is configured to push against the lifting member 8 upward. The lifting member 8 is located on the upper side of the push-top member 7 and is capable of rotating together with the gear 4. The lifting member 8 is configured to lift the transmission wheel 9. The transmission wheel 9 is circumferentially and fixedly sleeved outside of the valve stem 3. The gear 4 may form a power transmission with the valve stem 3 through the transmission wheel 9. A radial inner side of the rack 5 is provided with a push-top portion 53. The circumferential length of the push-top portion 53 is less than the circumferential length of the rack 5, and the rack 5 covers the push-top portion 53, so that when the rack 5 is just in contact with the gear 4, the push-top portion 53 and the linkage block 61 are not yet in contact. The push-top portion 53 may push the linkage block 61 to switch the linkage member 6 from an ejected position to a pushed-in position. In the ejected position, the push-top member 7 pushes against the lifting member 8 upward, and the lifting member 8 is disposed to pass through the gear 4 to lift the transmission wheel 9 until the transmission wheel 9 is disengaged from the gear 4. In the pushed-in position, the lifting member 8 moves downward along with the push-top member 7, and the transmission wheel 9 is engaged with the gear 4 and is capable of rotating synchronously with the gear 4.

It is to be noted that the structures of the two ball valve assemblies 10 are completely the same, the cooperation transmission processes of two sets of racks 5 and gears 4 are also completely the same; therefore, this embodiment uses one set of cooperated rack 5 and gear 4 as an example for illustration.

Figure 5:
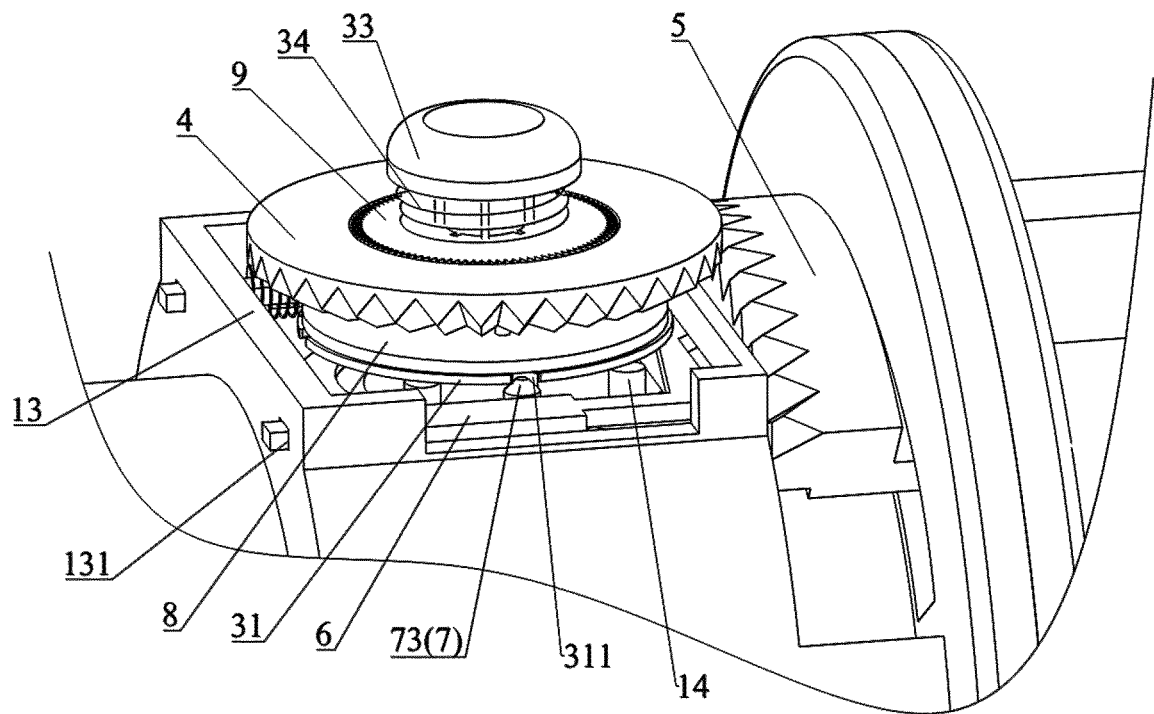
FIG. 5 is a schematic diagram showing a butt-joint of two ball valve assemblies in a second state according to an embodiment of the present disclosure.

Referring to FIG. 4, when one end of the rack 5 is just in contact with the gear 4, the butt-joint surfaces of the two valve bodies 1 may not be sealed well. In this case, the push-top portion 53 is not in contact with the linkage block 61, and the linkage block 61 is in the ejected position, and the push-top member 7 is in a push-top state. In this case, the push-top member 7 pushes against the lifting member 8 upward, and the lifting member 8 is disposed to pass through the gear 4 to lift the transmission wheel 9, so that the transmission wheel 9 is disengaged from the gear 4. In this case, the gear 4 may only idle, and the power may not be transmitted to the valve stem 3 and the valve core 2. Even if the rack 5 is rotated, the valve core 2 may not be opened, thereby avoiding the problem of liquid leakage caused by the fact that the butt-joint surfaces of the two valve bodies 1 are not sealed well at the initial contact stage of the rack 5 and the gear 4. Referring to FIG. 5, as the valve body 1 drives the rack 5 to rotate, for example, after the rack 5 is rotated by 10°, the connection portion 52 begins to enter the second hole segment 1112, and the rack main body 51 begins to form an axial limit tightening with the second hole segment 1112. In this case, the butt-joint faces of the two valve bodies 1 have been completely fitted and sealed, the push-top portion 53 inside the rack 5 begins to be in contact with the linkage block 61, and the linkage block 61 is pushed in axially inward, so that the linkage member 6 is switched to the pushed-in position. In this case, the linkage member 6 drives the push-top member 7 to move downward, and the lifting member 8 moves downward along with the push-top member 7, so that the transmission wheel 9 moves downward and is engaged with the gear 4. In this case, the power of the gear 4 may be transmitted to the valve stem 3 and the valve core 2 through the transmission wheel 9, that is, the transmission wheel 9 may rotate synchronously with the gear 4. As the rack 5 continues to rotate, the rack 5 drives the gear 4 to rotate, the gear 4 in turn drives the valve stem 3 to rotate through the transmission wheel 9, and the valve stem 3 drives the valve core 2 to rotate until the valve core 2 is completely opened to 90°. When the valve core 2 is completely opened, the push-top portion 53 has been disengaged from the linkage block 61, and the linkage block 6 is ejected again, the gear 4 is returned to an idling state so as to prevent the two ball valve assemblies 10 from being closed due to accidental contact. Similarly, when the two ball valve assemblies 10 need to be disengaged, the valve bodies 1 are rotated in a reverse direction. This process is the same as the above-described process, and the details are not repeated herein. After the two ball valve assemblies 10 are completely disengaged, the valve core 2 returns to the completely closed state, and the linkage member 6 is ejected again, so that the gear 4 is returned to the idling state, to prevent the valve core 2 from being opened due to accidental contact and thus preventing liquid leakage from occurring.

In an embodiment, as shown in FIG. 3, the linkage block 61 is an isosceles triangle or an isosceles trapezoid, and two circumferential ends of the push-top portion 53 have matching inclined surfaces 54 that match two inclined surfaces of the linkage block 61. In the process of opening the valve core 2, the valve bodies 1 are rotated in a forward direction, the matching inclined surface 54 of one end of the push-top portion 53 matches an inclined surface on a side of the linkage block 61, so that the linkage block 61 is pushed in. After being pushed in, an end surface between the two matching inclined surfaces 54 of the push-top portion 53 matches the free end of the linkage block 61, so that the pushed-in state is maintained to complete the opening process of the valve core 2. In the process of closing the valve core 2, the valve bodies 1 are rotated in the reverse direction, and the matching inclined surface 54 at another end of the push-top portion 53 matches an inclined surface on another side of the linkage block 61. Through the sliding fit between the inclined surfaces, the rotational movement of the push-top portion 53 may be converted into the axial movement of the linkage block 61 when the valve body 1 is rotated, so that the structure is simple, and the operation is convenient.

In an embodiment, as shown in FIG. 3, a mounting platform 12 is disposed on the valve body 1, a circumferential side of the mounting platform 12 is provided with a frame 13, and a first elastic member 63 is butted between an end of the linkage member 6 facing away from the linkage block 61 and the frame 13. When the linkage block 61 is pushed in by the push-top portion 53, the linkage member 6 moves in a direction away from the rack 5 in a horizontal direction and compresses the first elastic member 63. When the push-top portion 53 is disengaged from the linkage block 61, the linkage member 6 may be reset and ejected under the action of the elastic force of the first elastic member 63. The first elastic member 63 may be selected as a spring.

Figure 7:
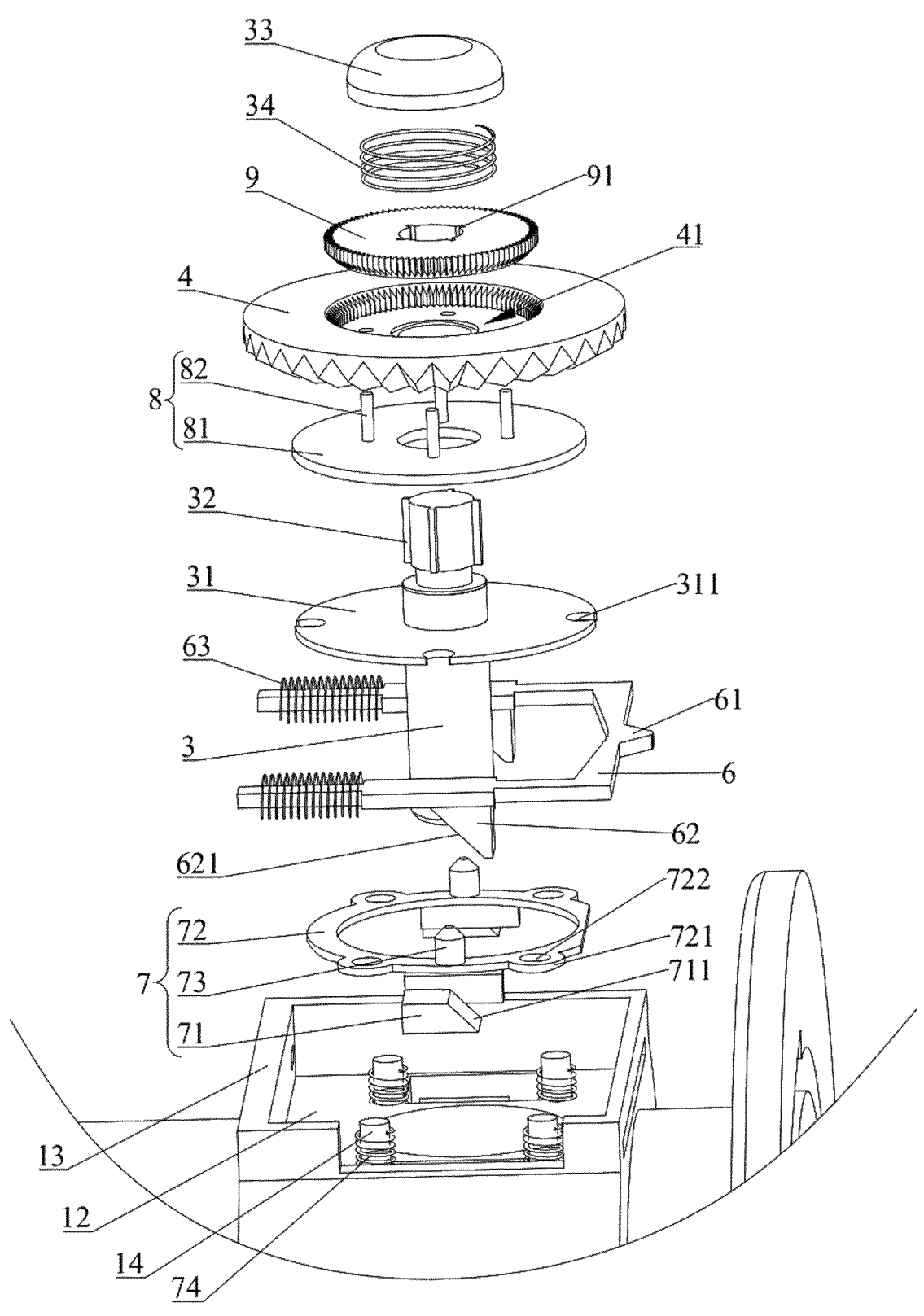
FIG. 7 is an exploded view of a single ball valve assembly according to an embodiment of the present disclosure.

In an embodiment, as shown in FIG. 7, a bottom surface of the linkage member 6 is provided with a first push block 62, and the first push block 62 has a first push-top inclined surface 621. A bottom surface of the push-top member 7 is provided with a second push block 71, and the second push block 71 is located on a lower side of the first push block 62 and has a second push-top inclined surface 711. The first push-top inclined surface 621 is in sliding fit with the second push-top inclined surface 711, so that the linkage member 6 is capable of driving the push-top member 7 to move downward when the linkage member 6 moves to the pushed-in position. When the linkage block 61 is pushed in by the push-top portion 53, the linkage member 6 moves in the direction away from the rack 5 in the horizontal direction, and the linkage member 6 drives the first push block 62 to move horizontally. In the moving process, the second push block 71 is driven to move downward through the cooperation of the first push-top inclined surface 621 and the second push-top inclined surface 711, and the second push block 71 drives the push-top member 7 to move downward, so that the structure is simple, and the operation is convenient.

Optionally, as shown in FIG. 7, the linkage member 6 is formed as a U-shaped structure and has two linkage arms oppositely disposed. The two linkage arms are respectively located on two opposite sides of the push-top member 7, and the bottom side of each linkage arm has the first push block 62. The two opposite sides of the push-top member 7 each have the second push block 71. Each first push block 62 is in sliding fit with the corresponding second push block 71, so that the push-top member 7 is subjected to a uniform force and moves stably. A side of the frame 13 facing the linkage block 61 is provided with an avoidance hole to allow the linkage block 61 to be ejected. Each linkage arm is formed as a stepped structure, so that the first elastic member 63 may abut against the step of the linkage arm to form a limiting effect.

In an embodiment, in conjunction with FIGS. 4 and 5, two sliding holes 131 are disposed on a side of the frame 13 facing away from the linkage block 61, and each of two free ends of the linkage member 6 facing away from the linkage block 61 is slidably disposed in the respective sliding hole 131. When the linkage block 61 is pushed in by the push-top portion 53, the two freedom ends of the linkage member 6 may slide out through the sliding hole 131, so that the linkage member 6 may slide freely and may play the movement guiding role.

Figure 6:
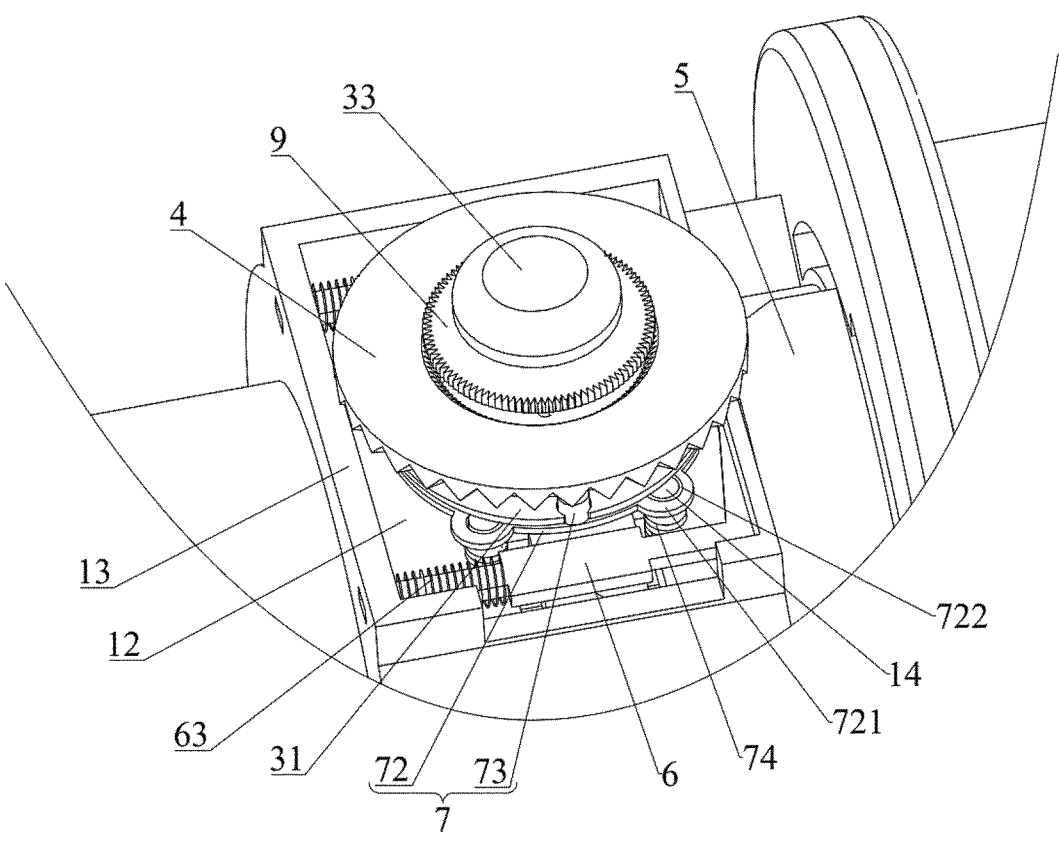
FIG. 6 is a schematic diagram showing a partial structure of a ball valve butt-joint structure according to an embodiment of the present disclosure.

In an embodiment, as shown in FIGS. 6 and 7, the push-top member 7 includes a chassis 72 and a push-top rod 73 connected to the chassis 72. The second push block 71 is fixedly connected to the bottom side of the chassis 72. The push-top rod 73 is configured to push against the lifting member 8, a circumferential side of the chassis 72 is provided with a lug 721, and a second elastic member 74 is abutted between the lug 721 and the mounting platform 12. When the linkage block 61 is pushed in by the push-top portion 53, the linkage member 6 moves in the horizontal direction and drives the push-top member 7 to move downward, and the push-top member 7 compresses the second elastic member 74. When the push-top portion 53 is disengaged from the linkage block 61, the linkage member 6 is reset and ejected under the action of the first elastic member 63, and the push-top member 7 is reset and moves upward under the action of the elastic force of the second elastic member 74, thereby returning to the state shown in FIG. 4. In the state shown in FIG. 4, the push-top member 7 pushes against the lifting member 8 upward, and the lifting member 8 lifts the transmission wheel 9 upward, so that the transmission wheel 9 is disengaged from the gear 4. The second elastic member 74 may be selected as a spring.

Optionally, as shown in FIG. 7, four lugs 721 are uniformly disposed on the circumferential side of the chassis 72. One second elastic member 74 is abutted between each lug 721 and the mounting platform 12, so that the push-top member 7 is subjected to a uniform force and moves stably during the reset and upward movement. In other embodiments, the number of lugs 721 and second elastic members 74 may also each be set to two, three or more, which may be flexibly set according to practical requirements and may not be specifically limited herein.

Optionally, as shown in FIGS. 6 and 7, a limit rod 14 is vertically disposed on the mounting platform 12, the second elastic member 74 is sleeved outside the limit rod 14, the lug 721 is provided with a limit hole 722, and the limit rod 14 is disposed to pass through the limit hole 722. With such an arrangement, the push-top member 7 may be prevented from rotating, so that the push-top member 7 may only move up and down, and the limit rod 14 may also guide the expansion and contraction of the second elastic member 74.

Optionally, four limit rods 14 are disposed on the mounting platform 12, and the four limit rods 14 and the four lugs 721 are disposed in a one-to-one correspondence manner. In other embodiments, the limit rods 14 may be provided in other numbers as long as the limit rods 14 are in one-to-one correspondence with the lugs 721, which is not specifically limited herein.

In an embodiment, as shown in FIG. 7, the lifting member 8 includes a lifting disk 81 and multiple lifting rods 82 connected to the lifting disk 81. The multiple lifting rods 82 are uniformly disposed at intervals in a circumferential direction of the lifting disk 81. The lifting disk 81 is sleeved outside the valve stem 3 and is located between the gear 4 and the push-top member 7. The push-top rod 73 is configured to push against the lifting disk 81. The lifting rod 82 may be disposed to pass through the gear 4 to lift the transmission wheel 9. Optionally, four lifting rods 82 which are uniformly arranged are disposed on the lifting disk 81, so that the transmission wheel 9 is subjected to a uniform force and moves stably during the upward movement. In other embodiments, the number of lifting rods 82 may be set to two, three or more, which may be flexibly set according to practical requirements and may not be specifically limited herein.

It is to be understood that in the idling process of the gear 4, since the lifting rod 82 is disposed to pass through the gear 4, the gear 4 may drive the lifting member 8 to rotate together. Since the lifting rod 82 lifts the transmission wheel 9 in an abutment manner, a friction force exists between the lifting rod 82 and the transmission wheel 9 during rotation, which may cause the transmission wheel 9 to follow-rotate, and thus the valve stem 3 and the valve core 2 to follow-rotate.

In order to solve the above-described problems, in this embodiment, as shown in FIGS. 4 and 7, the outer periphery of the valve stem 3 is fixedly connected to a rotation disk 31, the rotation disk 31 is located between the chassis 72 and the lifting member 8, and the rotation disk 31 is provided with a through hole 311. In the ejected position, the push-top rod 73 may push against the lifting member 8 through the through hole 311. Specifically, two push-top rods 73 are disposed on the chassis 72 and are oppositely disposed, the rotation disk 31 is provided with four through holes 311, the four through holes 311 are uniformly disposed at intervals in a circumferential direction of the rotation disk 31, the central angle between two adjacent through holes 311 is 90°, and each push-top rod 73 may match the two adjacent through holes 311.

Referring to FIG. 4, when one end of the rack 5 is just in contact with the gear 4, in this case, the push-top portion 53 is not in contact with the linkage block 61, the linkage block 61 is in the ejected position, and the push-top member 7 is in the push-top state under the action of the second elastic member 74. In this case, the through hole 311 of the rotation disk 31 is just opposite to the push-top rod 73, the push-top rod 73 passes through the through hole 311 of the rotation disk 31 to push against the lifting member 8 upward, and the lifting member 8 is disposed to passes through the gear 4 to lift the transmission wheel 9, thereby causing the transmission wheel 9 to disengage from the gear 4. In this case, when the rack 5 is rotated, the gear 4 may only idle. In the idling process of the gear 4, the gear 4 may drive the lifting member 8 to rotate. The pushing rod 73 is disposed to pass through the through hole 311 of the rotation disk 31; therefore, the follow-up rotation of the rotation disk 31 and the valve stem 3 can be restricted, and thus the follow-up rotation of the transmission wheel 9 can be restricted.

Referring to FIG. 5, as the valve body 1 drives the rack 5 to rotate, for example, after the rack 5 is rotated by 10°, the push-top portion 53 inside the rack 5 begins to be in contact with the linkage block 61, and the linkage block 61 is pushed in axially inward, so that the linkage member 6 is switched to the pushed-in position. In this case, the linkage member 6 drives the push-top member 7 to move downward, and the lifting member 8 moves downward along with the push-top member 7, so that the transmission wheel 9 moves downward and is engaged with the gear 4. In this case, the power of the gear 4 may be transmitted to the valve stem 3 and the valve core 2 through the transmission wheel 9. As the rack 5 continues to rotate, the rack 5 drives the gear 4 to rotate, the gear 4 in turn drives the valve stem 3 to rotate through the transmission wheel 9, and the valve stem 3 drives the valve core 2 to rotate. When the valve core 2 is rotated to 80°, the push-top portion 53 is disengaged from the linkage block 61, and the linkage member 6 is ejected again. After the linkage member 6 is ejected, the push-top member 7 may be ejected upward under the action of the second elastic member 74. However, in this case, since the rotation angle of the rotation disk 31 does not reach 90°, the upper through hole 311 of the rotation disk 31 and the push-top rod 73 are in a dislocated state. Even if the push-top rod 73 is ejected up, the push-top rod 73 only abuts against the bottom surface of the rotation disk 31 but cannot restrict the rotation of the rotation disk 31 nor push against the lifting member 8 upward. Therefore, the transmission is not disconnected, the valve body 1 continues to rotate, the rack 5 drives the gear 4 for transmission, the rack 5 may still drive the valve stem 3 through the transmission wheel 9, and the valve core 2 continues to be opened. When the valve core 2 rotates by 90°, that is, when the valve core 2 is completely opened, the through hole 311 on the rotation disk 31 is exactly aligned with the push-top rod 73. In this case, the push-top rod 73 passes through the through hole 311 to push against the lifting member 8 upward, the lifting member 8 in turn lifts the transmission wheel 9 upward, so that the transmission wheel 9 is disengaged from the gear 4. In this case, the transmission is disconnected, the gear 4 may only idle, and the movement of the valve core 2 is locked.

Similarly, when the two ball valve assemblies 10 need to be disengaged, the valve bodies 1 are rotated in the reverse direction. This process is the same as the above-described process, and the details are not repeated herein.

In this embodiment, as shown in FIG. 7, an outer wall of the valve stem 3 is provided with a convex rib 32 extending axially, an inner wall of the transmission wheel 9 is provided with a groove 91 extending axially, and the convex rib 32 is inserted into and fitted with the groove 91. With such an arrangement, the transmission wheel 9 may only move along the valve stem 3, but cannot rotate relative to the valve stem 3, whereby a rotation limiting connection is formed between the transmission wheel 9 and the valve stem 3, and the transmission wheel 9 may drive the valve stem 3 to rotate synchronously. In this embodiment, the number of convex ribs 32 and grooves 91 are each set to four, so that a stable rotation limiting connection is formed between the transmission wheel 9 and the valve stem 3. In other embodiments, the number of convex ribs 32 and grooves 91 may also each be set to other numbers, which may be flexibly set according to practical requirements and may not be specifically limited herein.

In another embodiment, the outer wall of the valve stem 3 is provided with the groove 91 extending axially, the inner wall of the transmission wheel 9 is provided with the convex rib 32 extending axially, and the convex rib 32 is inserted into and fitted with the groove 91, which can also achieve the above-described effect. The details are not repeated herein.

In an embodiment, as shown in FIG. 7, a center of the gear 4 is provided with an accommodation hole 41 for accommodating the transmission wheel 9, and a hole wall of the accommodation hole 41 is engaged with an outer peripheral wall of the transmission wheel 9 through a gear tooth. In this case, the transmission wheel 9 may form a rotation limiting connection with the gear 4 after moving downward into the accommodation hole 41, the transmission wheel 9 may drive the transmission wheel 9 to rotate synchronously, and the power may be transmitted between the transmission wheel 9 and the valve stem 3 through the transmission wheel 9. In another embodiment, the cooperation between the accommodation hole 41 and the transmission wheel 9 may also adopt a manner similar to the convex rib 32 and the groove 91 used between the transmission wheel 9 and the valve stem 3, and the details are not repeated herein.

Optionally, as shown in FIG. 7, the accommodation hole 41 is a blind hole, so that the transmission wheel 9 may abut against the hole bottom of the accommodation hole 41, and the transmission wheel 9 may be axially limited.

In an embodiment, as shown in FIGS. 5 and 7, the top end of the valve stem 3 is connected to a top cap 33, the outer diameter of the top cap 33 is greater than the outer diameter of the valve stem 3, a third elastic member 34 is sleeved outside the valve rod 3, and the third elastic member 34 is abutted between the top cap 33 and the transmission wheel 9. When the transmission wheel 9 is lifted upward by the lifting member 8 until the transmission wheel 9 is disengaged from the gear 4, the transmission wheel 9 compresses the third elastic member 34 upward. When the lifting member 8 moves downward, the transmission wheel 9 moves downward and is engaged with the accommodation hole 41 of the gear 4 under the action of the elastic force of the third elastic member 34, thereby returning to the state shown in FIG. 5. The third elastic member 34 may be selected as a spring.

Apparently, the above-described embodiments of the present disclosure are merely examples for clearly illustrating the present disclosure and are not intended to limit the embodiments of the present disclosure. Other variations or modifications in different forms may be made in light of the above description for those of ordinary skill in the art. This need not be, nor should it be, exhaustive of all embodiments. Any modification, equivalent replacement, improvement, and the like, made within the spirit and principles of the present disclosure shall be included within the scope of protection of the claims of the present disclosure.

What is claimed is:

1. A ball valve butt-joint structure, comprising two ball valve assemblies which are coaxially butt-jointed and have the same structure, wherein each of the two ball valve assemblies comprises a valve body, a valve core, a valve stem and a gear, the valve core is disposed within the valve body, one end of the valve stem is disposed to pass through the valve body and is fixedly connected to the valve core, another end of the valve stem extends out of the valve body and is sleeved with the gear, the gear is configured to drive the valve stem to rotate, a butt-joint end surface of each valve body is provided with a rack extending circumferentially, and the rack of one ball valve assembly of the two ball valve assemblies is configured to mesh with the gear of another ball valve assembly of the two ball valve assemblies.

2. The ball valve butt-joint structure of claim 1, wherein each of the two ball valve assemblies further comprises a linkage member, a push-top member, a lifting member and a transmission wheel, one end of the linkage member is elastically connected to the valve body, another end of the linkage member is convexly provided with a linkage block, the linkage member cooperates with the push-top member and is configured to drive the push-top member to move upward or downward, the transmission wheel is circumferentially and fixedly sleeved outside the valve stem, a radial inner side of the rack is provided with a push-top portion, a circumferential length of the push-top portion is less than a circumferential length of the rack, and the rack covers the push-top portion; and the push-top portion is configured to push the linkage block to switch the linkage member from an ejected position to a pushed-in position, in the ejected position, the push-top member pushes against the lifting member, the lifting member is disposed to pass through the gear to lift the transmission wheel until the transmission wheel is disengaged from the gear, in the pushed-in position, the lifting member moves downward along with the push-top member, and the transmission wheel is engaged with the gear and is configured to rotate synchronously with the gear.

3. The ball valve butt-joint structure of claim 2, wherein the linkage block is shaped as an isosceles triangle or an isosceles trapezoid, and two circumferential ends of the push-top portion have matching inclined surfaces that match two inclined surfaces of the linkage block.

4. The ball valve butt-joint structure of claim 2, wherein a bottom surface of the linkage member is provided with a first push block, the first push block has a first push-top inclined surface, a bottom surface of the push-top member is provided with a second push block, the second push block has a second push-top inclined surface, and the first push-top inclined surface is in sliding fit with the second push-top inclined surface, so as to drive the push-top member to move downward when the linkage member moves to the pushed-in position.

5. The ball valve butt-joint structure of claim 2, wherein a mounting platform is disposed on the valve body, a circumferential side of the mounting platform is provided with a frame, and a first elastic member is abutted between an end of the linkage member facing away from the linkage block and the frame.

6. The ball valve butt-joint structure of claim 5, wherein the frame is provided with a slide hole, and the end of the linkage member facing away from the linkage block is slidably disposed within the slide hole.

7. The ball valve butt-joint structure of claim 2, wherein the push-top member comprises a chassis and a push-top rod connected to the chassis, the push-top rod is configured to push against the lifting member, a mounting platform is disposed on the valve body, a circumferential side of the chassis is provided with a lug, and a second elastic member is abutted between the lug and the mounting platform.

8. The ball valve butt-joint structure of claim 7, wherein a limit rod is vertically disposed on the mounting platform, the second elastic member is sleeved outside the limit rod, the lug is provided with a limit hole, and the limit rod is disposed to pass through the limit hole.

9. The ball valve butt-joint structure of claim 7, wherein an outer periphery of the valve stem is fixedly connected to a rotation disk, the rotation disk is located between the chassis and the lifting member, the rotation disk is provided with a through hole, and in the ejected position, the push-top rod is configured to push against the lifting member via the through hole.

10. The ball valve butt-joint structure of claim 9, wherein two push-top rods are disposed on the chassis, the two push-top rods are disposed opposite to each other, the rotation disk is provided with four through holes, and the four through holes are uniformly disposed at intervals in a circumferential direction of the rotation disk.

11. The ball valve butt-joint structure of claim 2, wherein the lifting member comprises a lifting disk and a plurality of lifting rods connected to the lifting disk, the plurality of lifting rods are uniformly disposed at intervals in a circumferential direction of the lifting disk, the lifting disk is located between the gear and the push-top member, and the plurality of lifting rods are configured to pass through the gear to lift the transmission wheel.

12. The ball valve butt-joint structure of claim 2, wherein one of an outer wall of the valve stem and an inner wall of the transmission wheel is provided with a convex rib, another of the outer wall of the valve stem and the inner wall of the transmission wheel is provided with a groove, and the convex rib is configured to be inserted into and fitted with the groove.

13. The ball valve butt-joint structure of claim 2, wherein a center of the gear is provided with an accommodation hole for accommodating the transmission wheel, and a hole wall of the accommodation hole is engaged with an outer peripheral wall of the transmission wheel through gear teeth.

14. The ball valve butt-joint structure of claim 2, wherein a top end of the valve stem is connected to a top cap, an outer diameter of the top cap is greater than an outer diameter of the valve stem, a third elastic member is sleeved outside the valve stem, and the third elastic member is abutted between the top cap and the transmission wheel.

15. The ball valve butt-joint structure of claim 1, wherein one end of each valve body is provided with a flange, the two ball valve assemblies are butt-jointed at the flanges, the rack and a rotation hole which corresponds to a position of the gear and extends circumferentially are disposed on each flange, and the rack on one flange is configured to pass through the rotation hole on another flange and mesh with the gear corresponding to the rotation hole.

16. The ball valve butt-joint structure of claim 15, wherein the rotation hole comprises a first hole segment and a second hole segment communicating with each other, a radial width of the first hole segment is greater than a radial width of the second hole segment, the rack comprises a rack main body and a connection portion connected between the flange and the rack main body, a radial thickness of the rack main body is greater than a radial thickness of the connection portion, the rack main body is fitted to the first hole segment, and the connection portion is fitted to the second hole segment.

* * * * *